US010829836B2

(12) United States Patent
Herbert

(10) Patent No.: US 10,829,836 B2
(45) Date of Patent: Nov. 10, 2020

(54) DROSS MANAGEMENT SYSTEM AND METHOD

(71) Applicant: ALTEK Europe Ltd., Chesterfield (GB)

(72) Inventor: James Herbert, Exton, PA (US)

(73) Assignee: ALTEK EUROPE LTD., Chesterfield (GB)

( * ) Notice: Subject to any disclaimer, the term of this patent is extended or adjusted under 35 U.S.C. 154(b) by 421 days.

(21) Appl. No.: 15/237,934

(22) Filed: Aug. 16, 2016

(65) Prior Publication Data

US 2017/0051381 A1 Feb. 23, 2017

Related U.S. Application Data

(60) Provisional application No. 62/208,273, filed on Aug. 21, 2015.

(51) Int. Cl.
| | |
|---|---|
| *F27D 7/04* | (2006.01) |
| *C22B 21/00* | (2006.01) |
| *C22B 7/04* | (2006.01) |
| *F27D 3/12* | (2006.01) |
| *F27D 17/00* | (2006.01) |
| *F27D 27/00* | (2010.01) |
| *F27D 99/00* | (2010.01) |

(52) U.S. Cl.
CPC ............ *C22B 21/0069* (2013.01); *C22B 7/04* (2013.01); *C22B 21/0023* (2013.01); *C22B 21/0084* (2013.01); *F27D 3/12* (2013.01); *F27D 17/002* (2013.01); *F27D 27/00* (2013.01); *F27D 2099/0096* (2013.01); *Y02P 10/234* (2015.11)

(58) Field of Classification Search
CPC ........................ C22B 21/0069; C22B 21/0084
See application file for complete search history.

(56) References Cited

U.S. PATENT DOCUMENTS 1,931,285 A * 10/1933 Colcord .................... C22B 7/04
75/663
3,630,720 A 12/1971 Messner
4,540,163 A 9/1985 Van Linden
(Continued)

FOREIGN PATENT DOCUMENTS

| AT | 408349 B | 10/2001 |
|---|---|---|
| CN | 103069024 A | 4/2013 |

(Continued)

OTHER PUBLICATIONS

Office Action from corresponding Chinese Application No. 2016800484242 dated Feb. 3, 2019.
(Continued)

*Primary Examiner* — Scott R Kastler
(74) *Attorney, Agent, or Firm* — Norton Rose Fulbright US LLP

(57) ABSTRACT

A dross processing assembly includes a stirring station at which dross in a first dross recovery vessel is stirred and a pressing station at which previously stirred dross in a second dross recovery vessel is pressed simultaneously with the stirring of the dross in the first dross recovery vessel. The stirring station and the pressing station may be commonly housed in an enclosure. A conveyor system may advance dross recovery vessels through the dross processing assembly for continuous dross processing.

11 Claims, 2 Drawing Sheets

(56) References Cited

U.S. PATENT DOCUMENTS

| | | | |
|---|---|---|---|
| 5,102,453 | A | 4/1992 | Yerushalmi |
| 5,536,295 | A | 7/1996 | Slovich |
| 5,718,742 | A | 2/1998 | Eckert |
| 5,785,737 | A | 7/1998 | Lynn |
| 5,882,580 | A | 3/1999 | Pownall |
| 6,284,190 | B1 | 9/2001 | van de Lugt |
| 6,767,382 | B2 | 7/2004 | Stratigos |
| 8,845,781 | B2 | 9/2014 | Ishiwata |
| 2011/0283833 | A1 | 11/2011 | Herbert |
| 2014/0245864 | A1 | 9/2014 | Wycuff |
| 2017/0051381 | A1* | 2/2017 | Herbert ............... C22B 21/0084 |

FOREIGN PATENT DOCUMENTS

| | | |
|---|---|---|
| CN | 104302792 A | 1/2015 |
| EP | 1024206 A1 | 8/2000 |
| RU | 2159295 | 11/2000 |
| RU | 2194778 | 12/2002 |
| RU | 2418080 | 5/2011 |
| WO | 2000031482 A1 | 6/2000 |
| WO | 2011161443 A1 | 12/2011 |

OTHER PUBLICATIONS

Rushlander, M., "Sanshin Hot Dross Processing Aluminum Recovery System (ARS)," Aluminum, Dec. 2012, pp. 50-51.

"ARS—Hot Dross Processing System Aluminum Recovery System," Sanshin Sanwa Group, 2013, 10 pages.

Groteke, D., "Improving Aluminum Dross Recovery for Crucible Melting," Foundary, Jan. 22, 2010, 4 pages.

International Search Report and Written Opinion from corresponding International Application No. PCT/US/2016/047137, dated Oct. 21, 2016.

\* cited by examiner

DROSS MANAGEMENT SYSTEM AND METHOD

RELATED APPLICATION DATA

This application claims the benefit of U.S. Provisional Patent Application No. 62/208,273, filed Aug. 21, 2015, the disclosure of which is incorporated herein by reference in its entirety.

TECHNICAL FIELD

The technology of the present disclosure relates generally to the processing of dross that is generated from an aluminum recycling process or similar process. The dross processing includes recovery of aluminum from the dross and the cooling and/or quenching of the dross.

BACKGROUND

Dross compression apparatus are commonly used to recover non-ferrous metals, particularly aluminum, from dross. The dross is typically skimmed from a furnace that processes aluminum as part of an aluminum recycling or melting operation, but the dross may be obtained in other manners.

Aluminum dross is a combination of aluminum metal and aluminum oxides, as well as other possible components such as various oxides, nitrates and carbides. Generally, the dross floats on top of the molten aluminum metal in the furnace. Aluminum dross may contain anywhere from ten percent to ninety percent aluminum depending on the particular processing technique and the type of furnace. Therefore, the dross in an aluminum melting operation includes a significant amount of aluminum metal that is considered a valuable resource to be recovered.

DETAILED DESCRIPTION

Figure 1:
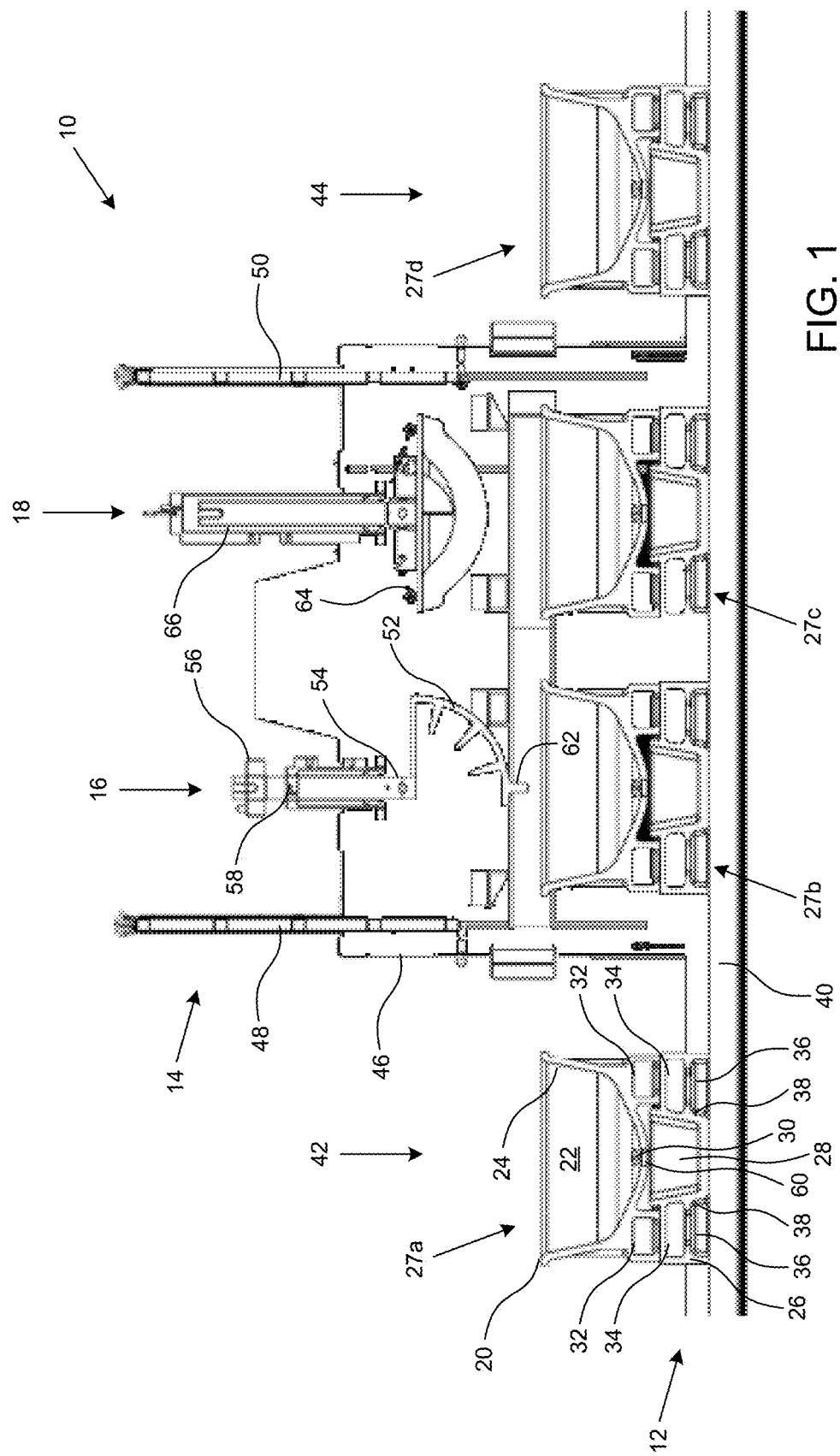
FIG. 1 is a cross-sectional view of an exemplary embodiment of a dross handling system taken along a longitudinal axis of a conveyor system therefor.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Disclosed are systems and methods for recovering aluminum from dross and for cooling and/or extinguishing the dross to reduce thermiting of the dross. The dross may be any aluminum-containing dross including dross with a low aluminum content and high salt and/or oxide content (e.g., so called black dross having as low as 5 percent to 10 percent aluminum), dross with a high aluminum content and low salt and/or oxide content (e.g., so called white dross having as high as 60 percent to 90 percent aluminum content), and dross where the aluminum and salt/oxide content is relatively balanced (e.g., so called grey dross).

In the systems and methods, a container of dross is moved into a dross stirring station where a dross stirrer is used to agitate the dross while the dross is hot and to separate recoverable aluminum from oxides, flux and other material. The recoverable aluminum may be drained from the container. Then, the container of dross is moved to a pressing station where a dross press is used to exert force on the dross. This may compress the dross to recover additional aluminum as well as cool and/or extinguish any burning of the dross. Following processing, the dross may be in the form of a dross skull.

The dross container may be advanced through the stations using a conveyor. One or more dross containers containing hot dross may be staged for processing with the dross stirrer and dross press. The conveyer may automatically advance each dross container from the staging area, to the dross stirrer for an appropriate amount of time during which the dross is stirred, then to the dross press for an appropriate amount of time during which the dross is pressed, then to a retrieval area. One dross container may be stirred while another dross container may be pressed. It is contemplated that, under some circumstances, the combination of dross stirring and dross pressing will synergistically result in more aluminum recovery and enhanced dross cooling than using either dross stirring or dross pressing alone.

Figure 2:
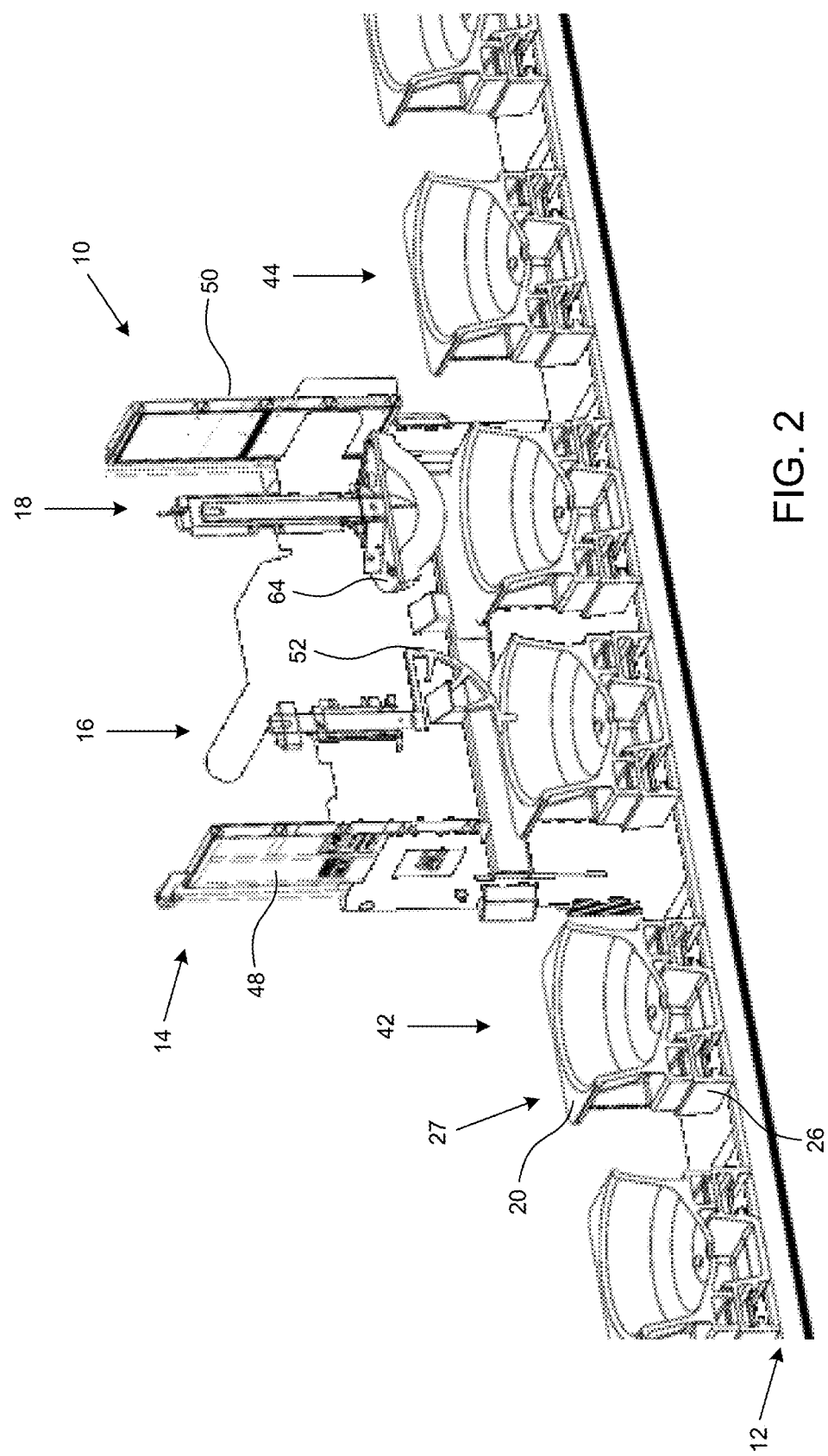
FIG. 2 is a perspective view of the system of FIG. 1.

With reference to FIGS. 1 and 2, illustrated is an exemplary dross processing system 10. The dross processing system 10 includes a conveyor assembly 12, and a processing assembly 14 that includes a stirring station 16 and a pressing station 18.

The conveyor system 12 moves dross pans 20 (also referred to as dross containers) through the processing assembly 14. Each dross pan 20 may include a well 22 into which hot dross (not shown) is received. In one embodiment, the well 22 is round in cross-section taken along a vertical axis of the dross pan 20. A circular cross-sectional shape of the well 22 permits an agitator of the stirring station 16 to rotate within the well and, in some embodiments, scrape the sidewalls 24 of the well 22. Each dross pan 20 may be stacked on top of and may be conveyed with a sow pan 26 (also referred to as a sow mold). Collectively, a paired dross pan 20 and sow pan 26 that move through the processing assembly 14 together will be referred to as a dross processing vessel 27. Thus, in one embodiment, the sow pan 26 may be moved with the dross pan 20 by the conveyor assembly 12 where the conveyor assembly 12 acts, for example, from underneath the dross processing vessel 27. In another embodiment, the dross pan 20 and the sow pan 26 are separate, but are both moved by the conveyor assembly 12 (e.g., the dross pan 20 may be located above the conveyor assembly 12 and the sow pan 26 may be located below the conveyor assembly 12). In still another embodiment, a sow pan 26 that is conveyed with the dross pan 20 may be omitted. In this embodiment, a permanent dross recovery trough may be position under the stirring station 16 and the pressing station 18 to capture any molten aluminum that drains from the dross pan 20 during the processing described below. Captured molten aluminum may be flowed to a recovery area. Alternatively, a sow pan 26 may be conveyed to and from the stirring station 16 and the pressing station 18 by a separate conveying system than the conveyor assembly 12 used to move the dross pans 20.

Continuing with the illustrated embodiment, the sow pan 26 may capture recovered aluminum in a recovery well 28 that is located below an opening 30 in the bottom of the well 22. Molten aluminum that is separated from the dross by gravity, by stirring and/or by pressing may drain through the opening 30 in the well 22 and into the recovery well 28.

The dross pan 20 and/or the sow pan 26 may be moved with a fork lift or other machinery by placing forks that are used to lift and transport the dross pan 20 and/or sow pan 26 into respective passages 32, 34 of the dross pan 20 and/or sow pan 26.

The dross pan 20 may include features to increase metal flow toward the bottom of the well 22 and opening 30. Other features may be present to aid in cooling, such as vanes, ports to accept the flow of cooling gas or liquid around the well, etc.

The conveyor assembly 12 is configured to advance the dross processing vessels 27 sequentially through a number of predetermined positions. Positions may include a staging position upstream of the processing assembly 14 at a staging area 42, a stirring position at the stirring station 16, a pressing position at the pressing station 18, and a retrieval position at a retrieval area 44 downstream of the processing assembly 14. In one embodiment, the processing assembly 14 is configured for continuous processing of dross. To this end, while dross in one dross pan 20 is stirred at the stirring station 16, dross that has been stirred and located in another dross pan 20 is pressed at the pressing station 18. During this time, a dross pan 20 containing unprocessed dross may be put into place at the staging area 42. Alternatively, an empty dross pan 20 may be placed (staged) at the staging area 42 and unprocessed dross may be conveyed or dumped into the staged dross pan 20. Also during this time, a dross pan 20 with processed dross and a sow pan 26 with recovered aluminum may be removed from the retrieval area 44 for further handling or disposal of the pressed dross in the well 22 and recovery of the aluminum in the well 28. As an alternative to removal of the dross pan 20 and/or sow pan 26 from the retrieval area, the pressed dross may be dumped from the dross pan 20 and/or the recovered aluminum may be tapped or poured from the sow pan 20.

To move the dross pans 20 from position to position, the conveyor assembly 12 may interact with the passages 32, 34 or other portions of the dross pan 20 and/or sow pan 26 to advance the dross and sow pans 20, 26. For example, the conveyor assembly 12 may include upwardly protruding lugs 36 that, after the dross and sow pan 20, 26 are lowered onto the conveyor assembly 12, extend into recesses 38 in the bottom of the sow pan 26. Alternatively, the lugs 36 may engage sidewalls of the sow pan 26. The bottom of the dross pan 20 and the top of the sow pan 26 may include coordinating features so that the dross pan 20 will stay with the sow pan 26 when the sow pan 26 is moved in a lateral direction by the conveyor assembly 12. The lugs 36 may be connected to a continuous conveyor feature 40, such as a moveable belt, track, linked assembly, etc., that advances the recovery vessels 27 through the various positions. In other embodiments, features other than lugs 36 may be used as an interface between the conveyor feature 40 and the recovery vessels 27.

In other embodiments, the conveyor assembly 12 includes a walking beam transfer assembly with any appropriate advancer members, arms or features to transfer recovery vessels 27 between each adjacent pair of positions. In this embodiment, one transfer assembly may advance recovery vessels 27 from the staging position to the stirring position, another transfer assembly may advance recovery vessels 27 from the stirring position to the pressing position, and a third transfer assembly may advance recovery vessels 27 from the pressing position to the recovery position.

As shown in FIG. 2, there may be multiple staging positions at the staging area 42 to allow for staging of multiple recovery vessels 27. Also, there may be multiple retrieval positions at the retrieval area 44.

The processing assembly 14 includes an enclosure 46. The stirring station 16 and the pressing station 18 are housed by the enclosure 46. Locating the stirring station 16 and the pressing station 18 in the enclosure 46 facilitates conveyance of the recovery vessels 27, facilitates control over the dross processing, and limits the release of fumes and dust that may be released by stirring and pressing the dross. Fumes and dust may be exhausted from the enclosure 46 and processed, such as with a filter, cyclonic dust collector and/or any other appropriate equipment. Conveniently, the fumes and dust from both the stirring and the pressing operations may be exhausted and processed together. In the illustrated embodiment, the staging area and the retrieval area are located outside of the enclosure. In one embodiment, the staging area 42 and/or the retrieval area 44 may include a hood to collect fumes and dust before and/or after dross processing. In this case, the fumes and dust collected at the staging and/or retrieval areas may be processed with the fumes and dust collected from the stirring and pressing stations.

The enclosure 46 may include a first door 48 that is opened to allow a recovery vessel 27 to travel from the staging position to the stirring position. The enclosure 46 also may include a second door 50 that is opened to allow a recovery vessel 27 to travel from the pressing position to the recovery position. During stirring and/or pressing of dross, the doors 48, 50 may be closed. In one embodiment, opening and closing of the doors 48, 50 may be coordinated with movement of the recovery vessels 27 by the conveyor system 12 and may be carried out in an automated manner.

For reference, in the illustration of FIG. 1, recovery vessel 27a is located in the staging position, recovery vessel 27b is located in the stirring position, recovery vessel 27c is located in the pressing position, and recovery vessel 27d is located in the recovery position.

The stirring station 16 includes an agitator 52 (also referred to as a paddle) that stirs the dross in the recovery vessel 27b located in the stirring position. For this purpose, the agitator 52 is connected to a shaft 54 that is driven to rotate by a motor 56, such as an electric motor or a hydraulic motor. The shaft 54 may be lowered and raised by a positioner 58 (e.g., a piston). More specifically, the shaft 54 may be rotated and lowered into the well 22 of the dross pan 20 so that the agitator 52 contacts and stirs the dross. In one embodiment, the agitator 52 is configured to scrape dross from the sides of the well 22. Also, the agitator 52 may include features (e.g., fins) to increase mixing of the dross. Mixing of the dross tends to separate molten aluminum from the dross. The molten aluminum, having a higher specific gravity than the dross, tends to move toward the opening 30 where it may drain into the well 28 of the sow pan 26. In one embodiment, multiple agitators 52 may be present, each of which are rotated in the same direction or counter-rotated. In one embodiment, a flux may be added to the dross to aid in separating the aluminum from the oxides.

It is possible that the stirring action may degrade the agitator 52 over time. Therefore, the agitator 52 may be configured to disconnect from the stirring station 16 and may be replaced with a new agitator 52.

The agitator 52 mechanically interacts with the dross. The stirring station 16 may rely on additional and/or alternative techniques for agitating the dross in the dross pan 20. An exemplary technique is mechanical vibration at one or both of the stirring station 16 or the pressing station 18 to encourage the molten aluminum to flow through the opening 30 and into the sow mold 26.

In one embodiment, a sacrificial plug 60 may be placed in the opening 30 before dross is placed in the well 22. While in place, the plug 60 keeps molten aluminum from draining out of the well 22 before and during stirring. This may be helpful to reduce clogging of the opening 30, maintain a hot temperature of the dross, and enhance stirring by lubricating the dross relative to the walls of the well 22. At the end of a stirring cycle the plug 60 may be pierced to allow the molten aluminum to drain. In other embodiments, the plug 60 may be pierced prior to the end of the stirring cycle, such as in the second half of the stirring cycle. The plug 60 may be pierced using a spike 62. The spike 62 may be part of the agitator 52 that is maintained in a position above the plug 60 during stirring. To pierce the plug 60, the agitator 52 may be lowered into a piercing position and then raised back to an appropriate one of a stirring position or a fully retracted position to allow for conveyance of the recovery vessel 27. In other embodiments, the spike 62 is separate from the agitator 52 or located on a second agitator to allow a first agitator to come in closer proximity to the walls of the well 22.

Before and/or during stirring, the temperature of the dross may be monitored. If the dross is too cold for adequate agitation and molten aluminum separation, exothermic flux may be added. In another embodiment, the dross pan 20 may be preheated and/or the well 22 may be refractory lined. In another embodiment, an inductive heater (not shown) may be used to heat the dross pan 20, particularly in the area of the drain opening 30. Other exemplary heat sources may include resistive electric heaters, combustion heat sources, and infrared radiation. Heating of the dross pan 20, especially at the opening 30, will tend to keep the aluminum in a molten state to reduce the occurrence of premature freezing of the aluminum to maximize draining of the aluminum from the dross pan 20. For example, while the recovery vessel 27 is located in the stirring position, the inductive heater may be brought into a position adjacent to or in contact with the dross pan 20 and activated to heat the dross. In other situations, if the dross becomes too hot, cold oxides may be added. Alternatively, an inert gas (e.g., argon) may be introduced. For example, a shroud may be lowered into a position above the dross pan 20 and the inert gas may be introduced between the shroud and the dross.

The pressing station 18 includes a press head 64 that may be lowered to cool and extinguish thermiting of the dross. Lowering and raising of the press head 64 may be accomplished with an actuator, such as a piston 66. Cooling and extinguishing of the dross may be accomplished by one or more of bringing the press head 64 into contact with an upper rim of the dross pan 20; bringing part of the press head 64 into the well 22 to contact the dross; and compressing the dross with the press head 64. Compressing the dross may force molten aluminum from the dross and/or form a dross skull. Resulting dross skulls may be processed using a secondary recycling process, such as a tumbling and classification technique. In one embodiment, the press head 64 may be cooled or function as part of a heat exchanger, such by passing a fluid (e.g., air, water or oil) through the head. The press head 64 may include ribs that aid in dross compaction and/or cooling.

An exemplary process flow is as follows. At the start of this example, recovery vessels 27 are respectively in the staging position, the stirring position, the pressing position, and the recovery position and at point in time when the recovery vessels 27 ready to be moved to respective next positions. Also, it will be assumed that the recovery vessel 27a at the staging position has been staged, including having been placed into position and the well 22 having been filled with hot dross. Modifications to the process will be apparent for situations such as non-continuous dross handling, and at the start or end of a continuous dross handling. Aspects of the process flow may be automated, including the advancing of recovery vessels through the various positions, the opening and closing of the doors, the stirring of dross and/or the pressing of dross, along with other related operations, such as the piercing of the plug, the heating or cooling of the dross for stirring, etc.

The flow may begin by removing the recovery vessel 27d from the recovery position to clear the recovery position for receipt of another recovery vessel currently located at the pressing position. It is noted that removal of the recovery vessel 27d from the recovery position may occur before the above-indicated point in time. That is, the removal of the recovery vessel 27d from the recovery position may occur while the processing assembly 14 stirs dross in a recovery vessel 27 located at the stirring station and presses dross in another recovery vessel 27 located at the pressing station.

Next, the doors 48, 50 are opened. Then, the conveyor assembly advances the recovery vessel 27 at the pressing position to the recovery position, advances the recovery vessel 27 at the stirring position to the pressing position and advances the recovery vessel 27 at the staging position to the stirring station. Advancement of the recovery vessels 27 may be made simultaneously or may be made individually.

Next, the doors 48, 50 are closed. Then, the stirring station 16 is used to stir dross in the recovery vessel 27 that is located at the stirring position. The stirring and, if applicable, piercing of the plug 60, may be carried out as described above. Simultaneously with the stirring, the pressing station is used to press the dross in the recovery vessel 27 that is located at the pressing position. The pressing may be carried out as described above. During the stirring and pressing, another recovery vessel 27 may be staged at the staging position. Following the stirring and pressing cycles, the agitator and the press head may be respectively retracted away from the dross. At this point, the process flow may be repeated.

In the disclosed process flow, dross in one recovery vessel is stirred while previously stirred dross from another recovery vessel is cooled by the pressing station 18. Also, each recovery vessel may be ejected from the processing assembly 14 once the pressing phase is complete. In one embodiment, the stirring cycle and the pressing cycle have the same or approximately the same duration, such as about 5 minutes. Preferably, the pressing cycle is long enough to quench the dross. After pressing, it is possible that the dross will still be hot, but will be in a dry and non-thermiting state.

In another embodiment, the pressing cycle is longer than the stirring cycle to increase cooling time of the dross. If the pressing cycle is significantly longer than the stirring cycle (e.g., twice as long or longer), then it is possible that more than one pressing stations 18 may be present. In this embodiment, the conveyor may be configured and the process flow may be modified to advance recovery vessels 27 from the stirring station 16 to the pressing stations 18 in an alternating fashion to maximum throughput by simultaneously stirring dross in one recovery vessel while cooling dross in more than one recovery vessel.

Control of the various process steps may be carried out by a computer-based system that executes logical instructions. The computer-base system may receive inputs from various sensors (e.g., mechanical sensors, light curtains, etc.) and users to control the dross handling process.

In another embodiment, the conveyor assembly 12 need not introduce recovery vessels 27 into the processing assembly 14 and/or need not remove the recovery vessels 27 from the processing assembly 14. In this embodiment, at the completion of stirring and pressing, a single door exposing both the stirring station 16 and the pressing station 18 may be opened. The recovery vessel 27 at the pressing station 18 may be manually removed (e.g., with a fork truck), the recovery vessel 27 at the stirring station may be automatically moved from the stirring station 16 to the pressing station 18 by the conveyor assembly 12 (or manually by fork truck), and another recovery vessel 27 with unprocessed dross may be manually placed at the stirring station 16 (e.g., with a fork truck). Then, the door may be closed and the stirring and pressing operations may be carried out.

Although certain embodiments have been shown and described, it is understood that equivalents and modifications falling within the scope of the appended claims will occur to others who are skilled in the art upon the reading and understanding of this specification.

What is claimed is:

1. A dross processing assembly that processes two different dross pans at the same time, each of the dross pans containing dross in which liquid aluminum is present, comprising:
   a stirring station comprising an agitator and at which dross in a first of the two dross pans is stirred with the agitator so as to separate desired recoverable aluminum from the dross in the first of the two dross pans;
   a pressing station comprising a press head and at which dross in a second of the two dross pans, which has been previously stirred at the stirring station, the dross in the second of the two dross pans is pressed with the press head simultaneously with the stirring of the dross in the first of the two dross pans, so as to further separate the desired recoverable aluminum from the dross in the second of the two dross pans; and
   a conveyor system configured to transfer each of the two dross pans from the stirring station to the pressing station.

2. The dross processing assembly of claim 1, further comprising an enclosure in which the stirring station and the pressing station are commonly housed.

3. The dross processing assembly of claim 2, wherein fumes and dust from the stirring station and the pressing station are exhausted from the enclosure together.

4. The dross processing assembly of claim 1, wherein the conveyor system is configured, following a stirring cycle of the dross in the first dross pan and a pressing cycle of the dross in the second dross pan, to advance the second dross pan to a retrieval area, advance the first dross pan from the stirring station to the pressing station, and advance a third dross pan from a staging area to the stirring station.

5. The dross processing assembly of claim 4, further comprising a first door between the staging area and the stirring station and a second door between the pressing station and the retrieval area, wherein the doors are operated in coordination with the conveyor system.

6. The dross processing assembly of claim 1, wherein a cycle of stirring dross and pressing dross, and conveying a dross pan from the stirring station to the pressing station, is automated.

7. The dross processing assembly of claim 1, wherein each dross pan sits on an associated sow pan during stirring and pressing.

8. The dross processing assembly of claim 7, wherein each dross pan and associated sow pan are advanced with each other from the stirring station to the pressing station.

9. The dross processing assembly of claim 1, wherein the first dross pan has a drain opening that is occluded at an initiation of stirring and is made unblocked at a point in time during the stirring or after the stirring.

10. The dross processing assembly of claim 9, wherein the drain opening is occluded by a sacrificial plug that is pierced to unblock the drain opening.

11. The dross processing assembly of claim 1, wherein the first dross pan remains stationary relative to the agitator during stirring.

* * * * *